US009947370B1

(12) United States Patent
Jin et al.

(10) Patent No.: US 9,947,370 B1
(45) Date of Patent: Apr. 17, 2018

(54) HARD DISK DRIVE SUPPORT IN USB ENCLOSURE TO IMPROVE VIBRATION ISOLATION

(71) Applicant: Western Digital Technologies, Inc., Irvine, CA (US)

(72) Inventors: Cheng Jin, San Jose, CA (US); Jifang Tian, Fremont, CA (US); Michael J. Herrmann, San Jose, CA (US); Zachary P. Hills, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 55 days.

(21) Appl. No.: 14/735,411

(22) Filed: Jun. 10, 2015

(51) Int. Cl.
*G11B 33/08* (2006.01)
*G06F 1/18* (2006.01)

(52) U.S. Cl.
CPC .............. *G11B 33/08* (2013.01); *G06F 1/187* (2013.01)

(58) Field of Classification Search
CPC ............................... G11B 33/08; G06F 1/187
USPC ........................................ 361/679.34, 679.33
See application file for complete search history.

(56) References Cited

U.S. PATENT DOCUMENTS

| 5,463,527 | A * | 10/1995 | Hager ................. | G11B 25/043 248/581 |
| 7,471,509 | B1 * | 12/2008 | Oliver ................. | G11B 25/043 312/223.2 |
| 7,701,705 | B1 | 4/2010 | Szeremeta | |
| 7,990,639 | B2 * | 8/2011 | Ouellette ............ | G07C 5/0875 360/1 |
| 8,064,194 | B2 | 11/2011 | Szeremeta | |
| 8,113,873 | B1 | 2/2012 | Sarraf | |
| 8,133,426 | B1 | 3/2012 | Yurchenco et al. | |
| 8,358,395 | B1 | 1/2013 | Szeremeta | |
| 8,417,979 | B2 | 4/2013 | Maroney | |
| 8,462,460 | B1 | 6/2013 | Szeremeta et al. | |
| 8,498,088 | B1 | 7/2013 | Klein | |
| 8,547,658 | B1 | 10/2013 | Szeremeta | |
| 9,099,163 | B1 | 8/2015 | Casey et al. | |
| 2015/0062800 | A1 | 3/2015 | Cariker et al. | |

* cited by examiner

Primary Examiner — Tuan T Dinh
Assistant Examiner — Rockshana Chowdhury
(74) Attorney, Agent, or Firm — Knobbe, Martens, Olson & Bear LLP

(57) ABSTRACT

A hard disk drive assembly having a hard disk drive positioned within an external housing. Isolators formed of a resilient material, such as an elastomeric material, are interposed between the hard disk drive and an external housing. The isolators also preferably having a plurality of openings that extend there through that lower the stiffness of the isolators during small deflections such as those caused by vibrations, but large deflections, such as those caused by shocks cause the openings or holes to close there by generating greater stiffness is response to external shocks.

21 Claims, 3 Drawing Sheets

HARD DISK DRIVE SUPPORT IN USB ENCLOSURE TO IMPROVE VIBRATION ISOLATION

BACKGROUND

Data storage devices such as hard disk drives (HDDs) are typically mounted within enclosures. Hard disk drives include rotating disks and one or more actuator arms that have pick up heads positioned on an end of the arm which travel over the spinning disk to read and write data. Physical shocks to the hard disk drive or external vibrations of the hard disk drive can result in inaccurate movement of the pickup heads which compromises the ability of the hard disk drive to read and write data to correct locations. The effects of some external vibrations at lower frequencies on existing hard disk drives can be at least partially ameliorated by control operations of actuator arms. However, vibrations at higher frequencies can be more difficult to ameliorate with controlled operation of the actuator arms.

DETAILED DESCRIPTION

Figure 1A:
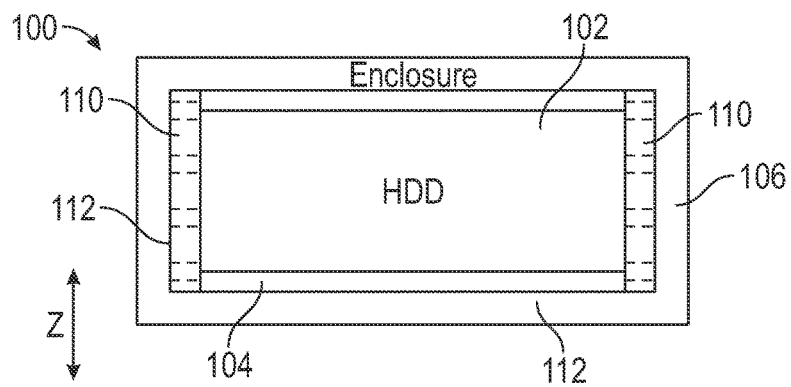
FIG. 1A is a schematic front cross-sectional view of an embodiment of a data storage device such as a hard disk drive that incorporates isolators that isolate the device from an outer housing.
Figure 1B:
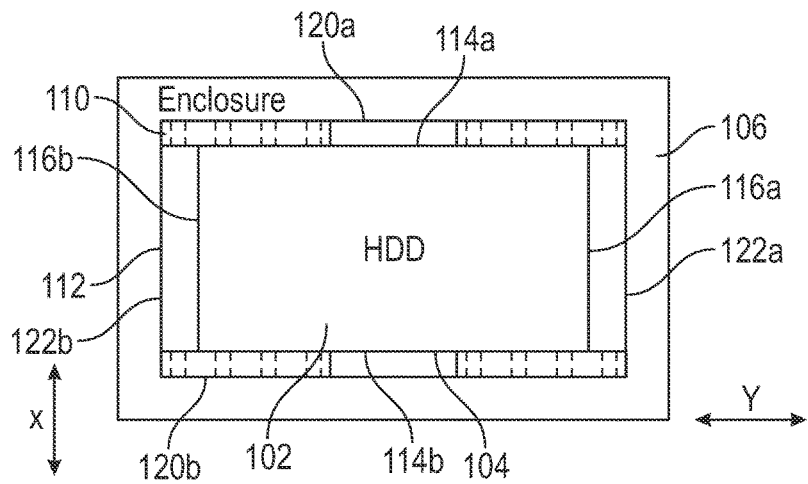
FIG. 1B is a schematic top cross-sectional view of an embodiment of the data storage device such a hard disk drive of FIG. 1A.

Reference will now be made to the drawings wherein like numerals refer to like parts throughout. As shown in FIGS. 1A and 1B, data storage devices such as hard disk drive assemblies 100 or solid state hybrid drives (SSHD) include hard disk drive devices that are typically mounted within an external enclosure 106. The hard disk drive assembly 100 typically includes a hard disk drive 102 that has a plurality of disks mounted on a spindle that is connected to a motor causing the spindle and disks to rotate. Actuator arms having read/write heads then travel over the spinning disks to read and write data to and from the disks. Typically the disks are mounted within a housing 104 that is typically considered part of the device 102. The hard disk drive 102 is then mounted within the external enclosure 106 in the manner shown in FIGS. 1A and 1B.

External vibrations can be transmitted from the external environment of the assembly 100 to the hard disk drive 102 via the external enclosure 106 which can affect the operation of the device 100. Further, external shocks can also be transmitted from the external enclosure 106 to the hard disk drive 102 which can also affect operation of the drive 102 or can even damage the drive 102.

To address these issues, isolators 110 are interposed between the housing 104 of the hard disk drive device 102 and the external enclosure 106. These isolators 110 are both formed of a material and are shaped to reduce the transmission of higher frequency vibrations from the external environment to the device 102 via the external enclosure 106. In some instances, the isolators 110 are formed so as to reduce the transmission of vibrations in the 100 to 500 Hz range. Further, the isolators 110 are also formed so as to absorb at least a portion of the force due to shock that would be transmitted from the external environment to the device 102 via the enclosure 106.

As shown in FIGS. 1A and 1B, the isolators 110 are preferably interposed between the walls 104 of the hard disk drive 102 and the inner walls 112 of the enclosure 106. In one implementation, the hard disk drive 102 has two elongate sides 114a, 114b and two short sides 116a, 116b. Similarly, the enclosure 106 has two elongate sides 120a, 120b and two short sides 122a, 122b that match the orientation of the sides of the hard disk drive 102. As shown in FIG. 1B, the isolators 110 are positioned so as to contact the elongate side walls 114a, 114b of the hard disk drive 102 and the short side walls 122a, 122b of the external housing 106. Further, the isolators 110 are interposed between the elongate walls 114a, 114b of the hard disk drive 102 and the inner surfaces 112 of the elongate walls 122a, 122b. It will be appreciated, however, that the exact orientation of the isolators 110 can vary without departing from the scope and spirit of the present teachings.

Figure 2A:
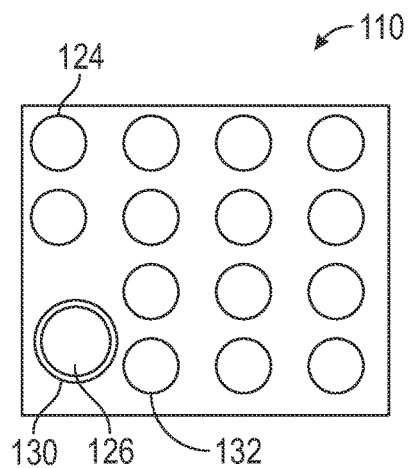
FIGS. 2A and 2B are front and perspective views of exemplary isolators that can be used with data storage devices.
Figure 2B:
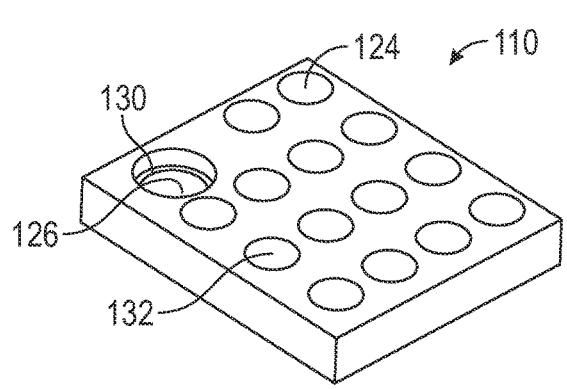

FIGS. 2A and 2B are illustrations of at least one exemplary embodiment of the isolators 110. Preferably, the isolators 110 are made from an elastomeric material such as rubber like EPDM rubber or a similar material having a modulus of elasticity (small strain) of approximately 1 to 10 Mega Pascal (MPa) and, in one non-limiting example have dimensions of 17 mm height, 22 mm length, 3 mm thickness. It will, however, be appreciated that the exact dimensions of the isolators 110 can vary without departing from the present teachings based upon the relative dimensions between the hard drive device 102 and the external housing 106.

As is also shown in FIGS. 2A and 2B, a plurality of through holes 124 are formed in the isolators 110 so as to extend through the thickness of the isolators 110. In the isolator 110 having the non-limiting exemplary dimensions above, there are 2 rows of 3 through holes 124 and two rows of 4 through holes 124 and a single larger mounting hole 126. In this non-limiting example, the through holes 124 have a diameter of approximately 3 mm and the larger mounting hole 126 has a diameter of 4 mm. The mounting hole 126 has a step 130 positioned in the inner walls of the opening 126 to receive the head of a fastener which is then screwed into an existing opening in the hard drive. The mounting hole 126 is used to mount the isolators 110 to the hard disk drive housing 104 using a fastener as will be described in greater detail below.

The holes 124 reduce the stiffness of the resilient material that comprises the isolators 110. As such, the isolators 110 are capable of absorbing the vibrational energy of vibration waves and, in particular, those higher frequency waves e.g., above approximately 100 Hz and, in particular, between approximately 300 and 500 Hz. The holes 124 are sized, however, so that when a shock is transmitted through the isolator 110, the inner walls 132 of the holes 124 contact each other and enhance the stiffness of the isolator 124. The holes 124 then absorb a portion of the force due to the shock by deforming so that the holes 124 close so that walls 132 contact each other and then the isolator 110 becomes less resilient and transmits a portion of the force due to the shock. In this way, forces on the hard disk drive 102 due to shocks can be reduced.

Figure 3:
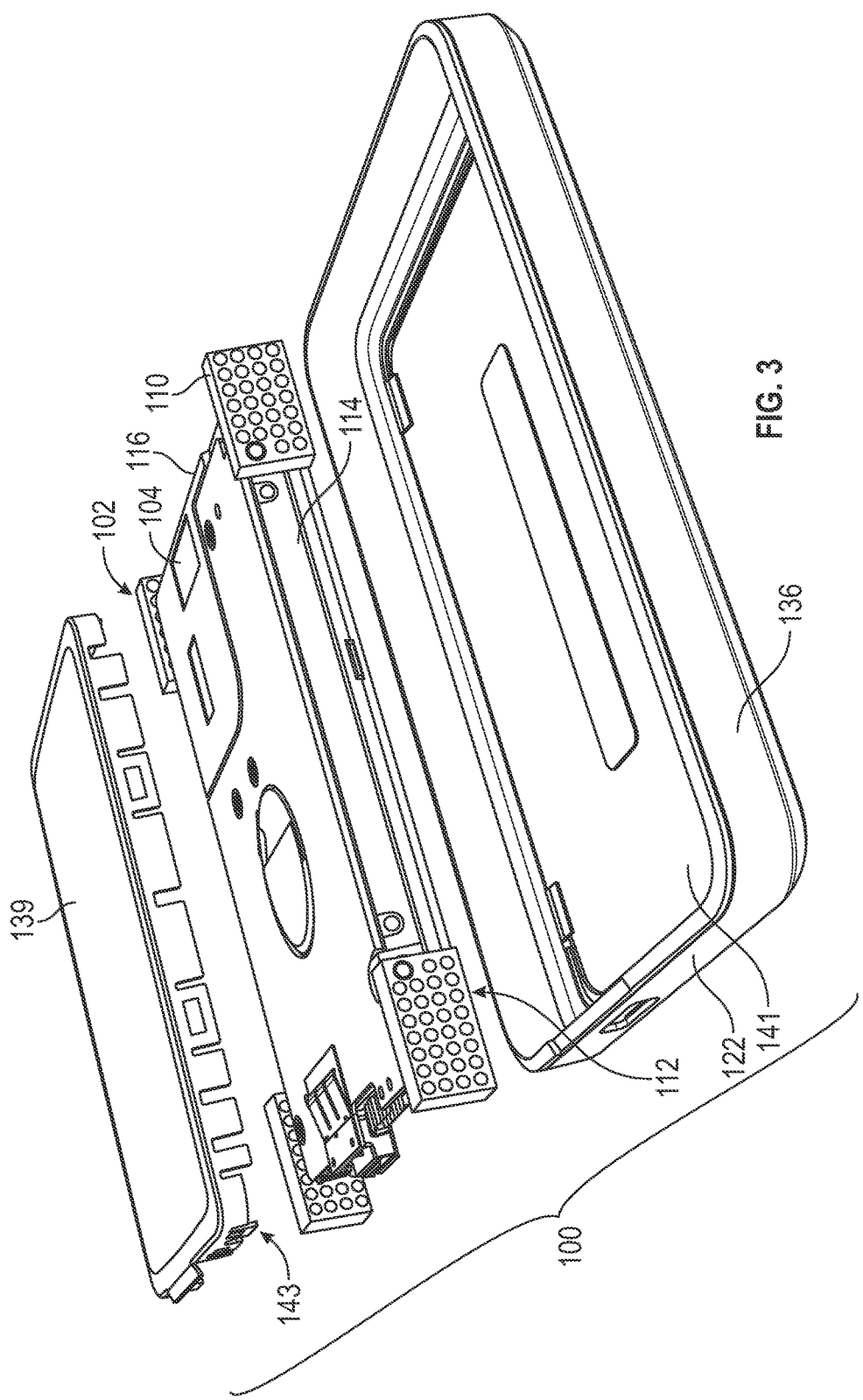
FIG. 3 is an exploded perspective view of a data storage device with isolators.
Figure 4:
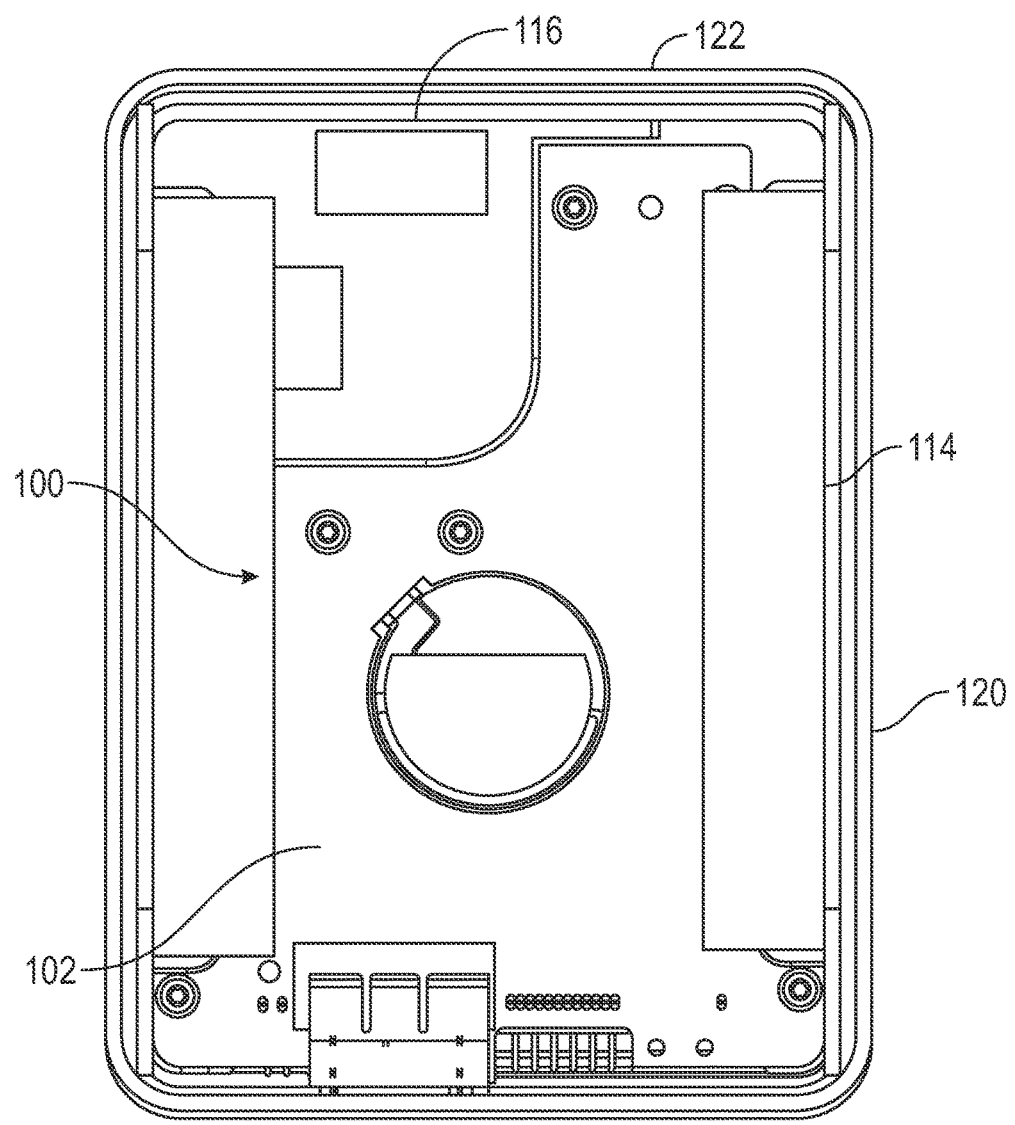
FIG. 4 is a top view of the data storage device of FIG. 3 illustrating an exemplary placement of the isolators.

FIGS. 3 and 4 illustrate a plurality of isolators 110 mounted on the hard disk drive housing 104 so as to be interposed between the housing 104 and the external housing 106. The isolators 110 in this implementation extend from a long side surface 114 of the hard disk drive housing 104 to the short side surface 122 of the external housing 106. In this way, vibrations and forces having components that are propagating in the direction of the long side surfaces 114 of the hard disk drive housing 104 are at least partially ameliorated by the isolators 110.

In this implementation, there is an isolator 110 positioned at each of the four corners of the hard disk drive housing 104 and extend toward the short side walls 122 of the external housing. In this particular implementation, the isolators extend outward and contact the short side walls 122 and area longer than the isolators shown in FIGS. 2A and 2B and have a different number of holes 124. It will be appreciated that the number and configuration of the isolators 110 can vary depending upon the implementation. Further, it will also be appreciated that the isolators 110 can be oriented to extend from the short side walls 116 of the hard drive housing 101 to the long side walls of the external housing 120 without departing the scope of the present teachings.

In one implementation, the external enclosure 106 comprises a bottom portion 136 and a top portion 139 that receive the hard disk drive 102 in the enclosure. In one implementation, the top portion 136 and the bottom portion 139 interconnect with the hard disk drive 102 positioned therein. In one implementation, the isolators 110 extend so as to contact the inner surfaces 141 and 143 of the portions 136, 139 (See, e.g., FIG. 1A) so that vibrations and forces having components extending in a direction perpendicular to the portions 136, 139 are at least partially absorbed by the isolators 110.

In one implementation, the holes 124 are sized and positioned so that the vibrations experienced by the data storage device housing in approximately the 300 Hz to 500 Hz range is reduced approximately 34-80% in a first direction, e.g. an X direction (See, FIG. 1B), an approximately 20-60% in a second direction orthogonal to the first direction, e.g., a Y direction (See, FIG. 1B) and approximately 74-97% in a third direction orthogonal to the first and second directions, e.g., a Z direction (See, FIG. 1A) compared to previous hard disk drives having a grommet for isolation. The degree of reduction in vibration will, of course, vary upon the implementation, however these empirically determined values provide an indication of the efficacy of the disclosed embodiment. While these exemplary reductions demonstrate the effectiveness of the isolators in the approximate 300 to 500 Hz range, the Applicant believes that significant reductions in vibration transmission to the hard disk drive 102 can occur at frequency greater than approximately 100 Hz In various embodiments, a disk drive may include a magnetic disk drive, an optical disk drive etc. In addition, while the above examples concern a disk drive, the various embodiments are not limited to a disk drive and can be applied to other data storage devices and systems, such as magnetic tape drives, solid state drives, hybrid drives, etc. In addition, some embodiment may include electronic devices such as computing devices, data server devices, media content storage devices etc. that comprise the storage media and/or control circuity as described above.

Although the foregoing discussion has shown, illustrated and described embodiments of the present invention and uses thereof, it will be appreciated by those skilled in the art that various changes, substitutions and modifications to the disclosed embodiments and uses thereof without departing from the spirit or scope of the present invention. Hence, the scope of the present invention should not be limited to the foregoing discussion but should be defined by the appended claims.

What is claimed is:

1. A storage device assembly comprising:
 a data storage device;
 a data storage device housing that has an interior that receives the data storage device;
 an enclosure having an interior that receives the data storage device housing; and
 at least one isolator that is interposed between the data storage device housing and the enclosure, wherein the at least one isolator:
 is formed of a resilient material that is contoured so as to attenuate vibrations having a frequency greater than approximately 100 Hz being transmitted between the enclosure and the data storage device housing; and
 has two planar surfaces and edge surfaces interposed between the two planar surfaces with a first planar surface being positioned so as to be parallel to a surface of the data storage device housing; and
 includes a plurality of circular holes having inner walls formed in the two planar surfaces, the plurality of circular holes each having an axis that is perpendicular to the two planar surfaces wherein the inner walls of the plurality of holes are exposed so as to contact each other in response to shocks.

2. The assembly of claim 1, wherein the resilient material is formed of an elastomeric material.

3. The assembly of claim 1, wherein the plurality of circular holes are sized and positioned so that the vibrations experienced by the data storage device housing in approximately the 300 Hz to 500 Hz range is reduced approximately 34-80% in a first direction, approximately 20-60% in a second direction orthogonal to the first direction and approximately 74-97% in a third direction orthogonal to the first and second directions.

4. The assembly of claim 1, wherein the data storage device housing and the enclosure define corresponding first and second surfaces, and corresponding side walls that interconnect the first and second surfaces, wherein the at least one isolator comprises a first isolator that is planar in configuration and is mounted on a first side wall of the data storage device housing so as to be parallel with the plane of the first side wall of the data storage device housing and extend towards and contact a first side wall of the enclosure that extends in a direction that intersects the plane of the first side wall of the data storage device housing so that forces due to shocks that are travelling in a direction parallel to the plane of the first side wall of the data storage device housing are at least partially attenuated by the plurality of circular holes.

5. The assembly of claim 4, wherein the plurality of circular holes in the first isolator are sized so that forces from shocks travelling in a direction parallel to the first side wall of the data storage device housing results in the plurality of circular holes being deformed so that the inner walls contact each, so that at least a portion of the force is transmitted through the first isolator between the data storage device housing and the enclosure.

6. The assembly of claim 5, wherein the at least one isolator further comprises a second isolator that is planar in configuration and is mounted on the first side wall so as to be parallel with the plane of the first side wall of the data storage device housing and to extend towards and contact a second side wall of the enclosure that extends in a direction that intersects the plane of the first side wall of the data storage device housing, so that forces due to shocks that are travelling in a direction parallel to the plane of the first side wall of the data storage device housing are at least partially attenuated by the plurality of circular holes.

7. The assembly of claim 6, wherein the at least one isolator comprises further a third isolator that is planar in configuration and is mounted on a second side wall of the data storage device that extends in a direction that intersects the plane of the first side wall of the data storage device, wherein the third isolator is mounted so as to be parallel with the plane of the second side wall of the data storage device housing and to extend towards and contact the first surface of the enclosure that extends in a direction that intersects the plane of the second side wall of the data storage device housing and the plane of the first side wall of the enclosure, so that forces due to shocks that are travelling in a direction parallel to the plane of the second side wall of the data storage device housing are at least partially attenuated by the plurality of circular holes.

8. The assembly of claim 4, wherein the data storage device housing and the enclosure each has the first and second surfaces and four side walls and wherein the at least one isolator further comprises a plurality of isolators that extend between each of the side walls and surfaces of the data storage device housing and the enclosure that are orthogonal to each other.

9. A storage device assembly comprising:
a data storage device;
a data storage device housing that has an interior that receives the data storage device;
an enclosure having an interior that receives the data storage device housing; and
at least one isolator that is interposed between the data storage device housing and the enclosure:
formed of a resilient material that has a plurality of holes formed therein wherein the plurality of holes have inner walls; and
has two parallel surfaces and edge surfaces interposed between the two parallel surfaces with a first parallel surface being positioned so as to be parallel to a surface of the data storage device housing; and
a plurality of circular holes having inner walls formed in the two parallel surfaces, the circular holes each having an axis that is perpendicular to the two parallel surfaces wherein the inner walls of the plurality of circular holes are exposed so as to contact each other in response to shocks.

10. The assembly of claim 9, wherein the resilient material is formed of an elastomeric material.

11. The assembly of claim 9, wherein the plurality of circular holes extend in a direction that is substantially perpendicular to the plane of a surface of the data storage device housing upon which the at least one isolator is positioned.

12. The assembly of claim 9, wherein the holes are sized and positioned so that the at least one isolator reduces vibrations of the data storage device housing having a frequency of greater than approximately 100Hz.

13. The assembly of claim 12, wherein the holes are sized and positioned so that the vibrations experienced by the data storage device housing in approximately the 300 Hz to 500 Hz range is reduced approximately 34-80% in a first direction, approximately 20-60% in a second direction orthogonal to the first direction and approximately 74-97% in a third direction orthogonal to the first and second directions.

14. The assembly of claim 9, wherein the data storage device housing and the enclosure define corresponding first and second surfaces, first, second, third and fourth side walls that interconnect the first and second surfaces wherein the first and second side walls are opposed to each other and the third and fourth side walls are opposed to each other, and wherein the at least one isolator comprises a first isolator that extend between the first side wall of the enclosure and a third side wall of the data storage device housing.

15. The assembly of claim 14, wherein the circular holes in the first isolator extend in a direction that intersects the plane of the third side walls of the data storage device housing and the enclosure, so that forces due to shocks that are travelling in a direction perpendicular to the first and second side walls of the data storage device housing and the enclosure induce the circular holes to deform to thereby attenuate the forces on the data storage device housing.

16. The assembly of claim 15, wherein the first isolator is formed so as to contact the first side wall of the enclosure and is coupled to the third side wall of the data storage device housing.

17. The assembly of claim 16, wherein the circular holes in the first isolator are sized so that forces from shocks travelling in a direction perpendicular to the first and second side walls results in the holes being deformed so that the inner walls of the circular holes contact each, so that at least a portion of the force is transmitted through the first isolator from the data storage device housing to the enclosure.

18. The assembly of claim 14, wherein the at least one isolator further comprises a second isolator that extends between the second side wall of the enclosure and the third side wall of the data storage device housing and wherein the circular holes in the second isolator extend in a direction that intersects the plane of both the third side walls of the data storage device housing and the enclosure, so that forces due to shocks that are travelling in a direction perpendicular to the first and second side walls of the data storage device housing and the enclosure induce the circular holes to deform to thereby attenuate the forces on the data storage device housing.

19. The assembly of claim 18, wherein the second isolator is sized so as to contact the second side wall of the enclosure and is coupled to the third side wall of the data storage device housing and wherein the circular holes in the second isolator are sized so that forces from shocks travelling in a direction perpendicular to the first and second side results in the circular holes being deformed so that the inner walls contact each, so that at least a portion of the force is transmitted through second isolator from the data storage device housing to the enclosure.

20. The assembly of claim 14, wherein the at least one isolator comprises a third isolator that is coupled to the first side wall of the data storage device and extends between the first side wall of the data storage device housing and the first surface of the enclosure wherein the circular holes in the third isolator extend in a direction that intersects the plane of the first side wall of both the data storage device housing and the enclosure, so that forces due to shocks that are travelling in a direction perpendicular to the first surface of the data storage device housing and the enclosure induce the circular holes to deform to thereby attenuate the forces on the data storage device housing.

21. The assembly of claim 20, wherein the at least one isolator further comprises a fourth isolator that extends between the second surface of the enclosure and the first side wall of the data storage device housing and wherein the circular holes in the second isolator extend in a direction that intersects the plane of the second surface of the data storage device housing and the enclosure, so that forces due to shocks that are travelling in a direction perpendicular to the second surface of the data storage device housing and the enclosure induce the circular holes to deform to thereby attenuate the forces on the data storage device housing.

\* \* \* \* \*

UNITED STATES PATENT AND TRADEMARK OFFICE
CERTIFICATE OF CORRECTION

PATENT NO. : 9,947,370 B1
APPLICATION NO. : 14/735411
DATED : April 17, 2018
INVENTOR(S) : Cheng Jin et al.

Page 1 of 1

It is certified that error appears in the above-identified patent and that said Letters Patent is hereby corrected as shown below:

In the Specification

In Column 2 at Line 42 (approx.), Change "3through" to --3 through--.

In the Claims

In Column 5 at Line 60 (approx.), In Claim 12, change "100Hz." to --100 Hz.--.

Signed and Sealed this
Twentieth Day of August, 2019

Andrei Iancu
*Director of the United States Patent and Trademark Office*